United States Patent [19]

Antrim et al.

[11] 4,239,906

[45] Dec. 16, 1980

[54] METHOD FOR OBTAINING A PURIFIED CELLULOSE PRODUCT FROM CORN HULLS

[75] Inventors: Richard L. Antrim; Yuk-Charn Chan, both of Clinton; John R. Crary, Jr.; Donald W. Harris, both of Camanche, all of Iowa

[73] Assignee: Standard Brands Incorporated, Wilton, Conn.

[21] Appl. No.: 46,584

[22] Filed: Jun. 7, 1979

[51] Int. Cl.³ .................. C08B 1/00; C08B 37/14
[52] U.S. Cl. ........................ 536/56; 127/29; 127/34; 127/37; 536/1; 536/114; 536/120
[58] Field of Search ............ 536/56, 1, 114, 120; 127/29, 34, 37

[56] References Cited

U.S. PATENT DOCUMENTS

| | | | |
|---|---|---|---|
| 1,819,233 | 8/1931 | Darling | 127/34 |
| 2,218,567 | 10/1940 | White | 536/121 |
| 2,709,699 | 5/1955 | Wolf et al. | 536/1 |
| 2,801,955 | 8/1957 | Rutenberg et al. | 536/1 |
| 2,868,778 | 1/1959 | Watson et al. | 536/114 |
| 3,716,526 | 2/1973 | Schweiger | 536/1 |
| 3,817,825 | 6/1974 | Conca et al. | 162/89 |
| 3,879,373 | 4/1975 | Gerrish et al. | 536/1 |
| 3,937,647 | 2/1976 | Backstrom et al. | 162/16 |
| 3,970,712 | 7/1976 | Friese | 127/37 |
| 3,990,904 | 11/1976 | Friese et al. | 127/37 |
| 4,038,481 | 7/1977 | Antrim et al. | 536/56 |
| 4,089,848 | 5/1978 | Bell et al. | 127/29 |
| 4,102,705 | 7/1978 | Pfeiffer et al. | 127/37 |
| 4,104,463 | 8/1978 | Antrim et al. | 536/56 |
| 4,105,467 | 8/1978 | Buckl et al. | 127/37 |

FOREIGN PATENT DOCUMENTS 2358472 5/1975 Fed. Rep. of Germany.
2365457 5/1975 Fed. Rep. of Germany.
48-34522 10/1973 Japan.

OTHER PUBLICATIONS

Chemical Abstracts, vol. 84, 1976, p. 91871h.

*Primary Examiner*—Ronald W. Griffin
*Attorney, Agent, or Firm*—Richard Kornutik

[57] ABSTRACT

A cellulose product containing hemicellulose derived from corn hulls is treated under acidic conditions to obtain purified cellulose having present at least about 70 percent alpha-cellulose. Hemicellulose or a xylose-containing solution may also be obtained.

14 Claims, No Drawings

METHOD FOR OBTAINING A PURIFIED CELLULOSE PRODUCT FROM CORN HULLS

BACKGROUND OF THE INVENTION

1. Field of the Invention

This invention relates to a method for obtaining a high purity cellulose product from corn hulls. More particularly, this invention relates to the treatment of cellulose products derived from corn hulls and containing hemicellulose to obtain high purity cellulose products and intact hemicellulose or a xylose-containing solution.

2. Description of the Prior Art

Cellulose occurs in nature in the form of fibers which consist of long straight chains of anhydroglucose units. In pulping operations for isolating cellulose from the other constituents of wood or similar materials, some degree of degradation of the cellulose inevitably occurs, leading to a shortening of the average chain length of the cellulose molecules. In general, the longer the average chain length of the cellulose molecules, the stronger will be the fiber in terms of resistance to heat, chemicals, etc. Cellulose fibers whose anhydroglucose chains have not been substantially degraded are referred to as alpha-cellulose.

Hemicellulose is a term which broadly encompasses the principal polysaccharides present in plant material. Included among these polysaccharides are the pentosans such as xylan which may be converted to xylose by acid hydrolysis.

Although small amounts of hemicellulose are desirable in cellulosic products intended for use in papermaking wherein they improve tensile and bursting strength, it is preferred that the hemicellulose be removed to a substantial degree from pulps used for producing rayon and cellulose in order to reduce haze formation.

The majority of chemical grade cellulose products are derived from the wood pulping industry wherein relatively drastic pulping conditions are utilized. Generally, alkaline Kraft cooking or acid sulfite pulping processes are utilized which comprise a delignification, acid hydrolysis, alkaline extraction and bleaching. There are numerous variations of these procedures.

In the acid sulfite pulping process, a major portion of the hemicellulose in the wood is removed during delignification. The pulping liquid is generally highly acidic having a pH of 1 to 2 and usually contains 6 to 8.5 percent $SO_2$, based upon the dry weight of the material present. In addition, the pulping liquor contains substantial quantities of mono- or di-valent metal ions.

The conditions employed during pulping normally involve heating in the range of 130° to 150° C. at a pressure of 75 to 125 psi for periods of 6 to 12 hours. Additional treatments such as multistage bleaching requiring 3 to 6 steps accompanied by hot extraction with concentrated alkali are utilized to obtain a chemical grade or highly purified cellulose product.

U.S. Pat. No. 3,817,825 to Conca et al. discloses an improved method for obtaining highly purified cellulose. In this method, after bleaching, the cellulose is subjected to a series of chemical treatments to remove the remaining hemicellulose and other impurities. In a variation of the Kraft process, an acid prehydrolysis is utilized before the alkaline delignification step which facilitates the removal of the hemicellulose. Gutierrez Espinosa et al., C.A. 84: 91781h (1976), disclose a method for making a chemical grade cellulose from sugar cane bagasse by a variation of the Kraft process. A prehydrolysis step is required to reduce the hemicellulose content of the cellulose fraction in order to make the latter satisfactory for preparing a viscose solution for the manufacture of rayon fiber. Other methods disclosed in the art for preparing purified cellulose are set forth in U.S. Pat. No. 3,937,647 to Backstrom et al. and Japanese Pat. No. 34,522/73 to Fujioka et al.

There are a number of procedures disclosed in the art directed to the extraction of hemicellulose from fibrous waste products such as corn hulls, cottonseed hulls, peanut hulls, oat hulls and the like utilizing aqueous alkali. Exemplary of such procedures are those disclosed in U.S. Pat. No. 1,819,233 to Darling; U.S. Pat. No. 2,218,567 to White; U.S. Pat. No. 2,709,699 to Wolf et al; U.S. Pat. No. 2,810,955 to Rutenberg et al.; U.S. Pat. No. 2,868,778 to Watson et al.; and U.S. Pat. No. 3,879,373 to Gerrish et al. These procedures generally suffer the disadvantage of producing a colored, impure, hemicellulose product. German Offenlegungsschriften Nos. 2,358,472 and 2,365,457 disclose processes for treating oat hulls to recover xylose, cellulose and lignin.

U.S. Pat. No. 3,716,526 to Schweiger teaches a method for producing a relatively pure hemicellulose product whereby corn hulls are first subjected to an alkaline extraction procedure to produce a crude hemicellulose product and then treating such product with an aqueous organic acid-containing liquid to solubilize the impurities. U.S. Pat. No. 3,970,712 to Friese and U.S. Pat. No. 3,990,904 to Friese et al. disclose methods for treating oat husks to obtain a xylose solution. U.S. Pat. No. 4,038,481 to Antrim et al. discloses a method for treating corn hulls to obtain three fractions therefrom, namely, a cellulosic fraction, which may contain up to 35 percent by weight of hemicellulose, a hemicellulose fraction and a non-carbohydrate fraction. U.S. Pat. No. 4,104,463 also to Antrim et al. is directed to a process for treating corn hulls to obtain therefrom a holocellulose fraction and a non-carbohydrate fraction.

OBJECTS OF THE INVENTION

It is a principal object of the present invention to obtain a high purity cellulose product from corn hulls.

It is another object of the present invention to obtain from corn hulls a high purity cellulose product containing at least about 70 percent alpha-cellulose on a dry weight basis.

It is a further object of the present invention to obtain from corn hulls intact hemicellulose or a xylose-containing solution and a high purity cellulose product containing at least about 70 percent alpha-cellulose on a dry weight basis.

SUMMARY OF THE INVENTION

An impure cellulose product comprising holocellulose or cellulose containing hemicellulose derived from corn hulls by a process whereby non-carbohydrate material is solubilized is treated under acidic conditions to obtain a cellulose product having present at least about 70 percent alpha-cellulose on a dry weight basis.

DETAILED DESCRIPTION OF THE INVENTION

The teachings and disclosures of U.S. Pat. No. 4,039,481 entitled "Method for Treatment of Corn Hulls" and U.S. Pat. No. 4,104,463 entitled "Method for Treatment of Corn Hulls," both to Antrim et al., are incorporated herein by reference.

In U.S. Pat. No. 4,038,481 there is disclosed a process for obtaining three fractions from corn hulls. These comprises a cellulose fraction, a hemicellulose fraction and a non-carbohydrate fraction. U.S. Pat. No. 4,104,463 discloses a method for obtaining a non-carbohydrate fraction and a holocellulose fraction from corn hulls.

The method of the present invention is directed to treating either of the above mentioned holocellulose or cellulose fractions to obtain a high purity cellulose product. Also, depending upon the conditions of treatment, intact hemicellulose or a xylose-containing solution may be obtained. However, the conditions of treatment should be such to obtain a cellulose product containing at least about 70 percent alpha-cellulose and most preferably a cellulose product containing at least about 80 percent alpha-cellulose.

Manufacturers of cellulose products generally set their own specifications in regard to the purity thereof. Therefore, the terms "chemical grade" or "high purity" cellulose are somewhat nebulous in respect to the actual purity thereof. For this reason, in the present method the purity of the treated cellulose is expressed in terms of its alpha-cellulose content.

DETERMINATION OF ALPHA-CELLULOSE

The method shown immediately below for measuring the alpha-cellulose content of the treated cellulose products is a modification of the TAPPI Method No. T 203 OS-61.

All liquids should be kept, as nearly as possible, at 20±0.1° C. Place 1.0 g air dried cellulose product into a 250 ml beaker. Add 25 ml of a 17.5% sodium hydroxide solution, stir, and allow the solution mixture to set at 20° C. for 45 minutes. Then add 33.4 ml of distilled water and filter with vacuum through a fritted glass crucible, medium porosity. Before pad forms, release the vacuum and add more distilled water. Mix the sample and water by stirring and draw down again. Repeat this procedure until a total of 250 ml of water has been used to wash the sample. Add 13 ml of a 10% acetic acid solution, stir and allow to set 5 minutes before filtering again. Wash with about 90 ml distilled water to remove the acid and follow with small portions of alcohol and ether. Dry in an oven at 105° C. for 30 minutes, cool and weigh. This alkali insoluble residue is the alpha-cellulose content of the cellulose product.

The short-chain cellulose or more highly degraded portion of the product is soluble in the alkali and will remain in solution and may be recovered by conventional means.

Typically, the acid treatment is performed by subjecting the fraction to two or more extraction steps each comprising heating an aqueous slurry of the fraction at pH values in the range of from about 2.0 to about 5.5 and preferably in the range of from about 3.0 to about 4.5. The major portion of the hemicellulose appears to be solubilized during the first extraction step while lesser quantities are solubilized during subsequent extractions. The period during which the treatments are performed may range from about 1 to about 120 minutes but preferably will be from about 5 to about 30 minutes. Reaction temperatures of from about 75° to about 100° C. have provided satisfactory results. In general, the first extraction may be carried out in a relatively short period while subsequent extractions may be more protracted.

Although numerical ranges have been set forth in regard to performing the acid treatment, it should be understood that, due to the interrelation of extraction conditions, achieving the objectives of the invention will depend on the utilization of a suitable combination of treatment parameters.

In the main, the surprising aspect of the process is that it may be carried out much more simply than prior art processes by utilizing a purely aqueous system and relatively mild conditions. In addition to providing a cellulose product containing greater amounts of alpha-cellulose, the yield of intact hemicellulose is substantially increased over that obtained by prior art methods. For comparison purposes, the yields of hemicellulose given in the examples of a number of patents are set forth in Table I below:

TABLE I

| Patent | Corn Hull Source | Yield of Hemicellulose (percent) as set forth in the Examples of the Patents | | | |
| --- | --- | --- | --- | --- | --- |
| | | Ex. 1 | Ex. 2 | Ex. 3 | Ex. 4 |
| U.S. Pat. No. 2,709,699 to Wolf et al. | Destarched Corn Hulls | 34.2 | 33.4 | 37.8 | 39.2 |
| U.S. Pat. No. 2,861,955 to Rutenberg et al. | Corn Bran | 35.7 | 9.1 | 27.6 | 27.0 |
| U.S. Pat. No. 2,868,778 to Watson et al. | Corn Coarse Fiber | 30.7 | 22.8 | not reported | not reported |
| U.S. Pat. No. 4,038,481 to Antrim et al. | Corn Hulls | 36.1 | 40.8 | 42.7 | not reported |

From the above table, it is seen that by practicing the techniques of the prior art, the maximum yield of hemicellulose obtained is about 42 percent whereas under the preferred conditions of the present method, at least about 45 percent of intact hemicellulose is recovered.

To obtain the intact hemicellulose at these yields, it is essential that the corn hulls be subjected to a particular sequence of treatments which is disclosed in aforementioned U.S. Pat. Nos. 4,038,481 or 4,104,463 including prior removal of the non-carbohydrate fraction. Then, either the holocellulose fraction described in the latter patent or the cellulose fraction described in the former patent is treated in accordance with the present invention. The fraction may be slurried in heated acidified water wherein the hemicellulose will be liberated or solubilized and the resulting solution separated from the undissolved material which is composed principally of cellulose. The extraction procedure may be repeated to ensure substantially complete removal of the intact hemicellulose. The intact hemicellulose may be recovered by techniques well known in the art such as alcoholic precipitation or evaporation.

The purity of the cellulose obtained by the process of the present invention under varying conditions may also be determined by measuring the pentosan (hemicellulose) content, principally xylan, of the cellulose product by the phloroglucinol procedure described in *Official Methods of Analysis of the Association of Official Analytical Chemists*, 10th Ed. The conditions under which the present method is carried out should be such that the xylan content of the purified cellulose is less than about 5% based upon the dry weight of the cellulose.

OBTAINING INTACT HEMICELLULOSE

The holocellulose or cellulose fraction is treated under relatively mild conditions to obtain intact hemicellulose. The period, temperature and pH at which the treatment is effected are all interrelated variables and, therefore, it is difficult to express numerical ranges which would achieve the objectives of the invention. Table II, below, illustrates the effect of varying treatment conditions on the amount of intact hemicellulose recovered and the amount of alpha-cellulose in the cellulose product.

TABLE II
EFFECT OF TREATMENT CONDITIONS ON YIELDS OF INTACT HEMICELLULOSE AND CELLULOSE

| Holo-Cellulose (%)[1] | Treatment Conditions | Percent of Corn Hull Components Recovered[1] (dry, ash-free basis) | | | |
|---|---|---|---|---|---|
| | | Hemi-Cellulose | Cellulose Product | Alpha-Cellulose Content of Cellulose Product[3] | Hydrolyzed Component[2] |
| 79.1 | pH 3.2; 5 min/30 min/70 min at 100° C. | 53.4 | 24.4 | 71.3 | 1.3 |
| 79.1 | pH 3.2; 60 min/60 min at 100° C. | 49.2 | 24.4 | 71.3 | 5.5 |
| 79.2 | pH 4.2; 60 min/60 min at 100° C. | 46.9 | 30.3 | 57.4 | 2.0 |
| 80.0 | pH 5.2; 60 min/60 min at 100° C. | 43.3 | 35.5 | 49.0 | 1.2 |
| 78.7 | pH 5.5; 60 min/60 min at 100° C. | 43.4 | 35.3 | 49.3 | 0.0 |
| 79.0 | pH 2.2; 60 min/60 min at 75° C. | 29.0 | 41.9 | 41.5 | 8.1 |

[1]Based upon weight of corn hulls
[2]Represents degraded carbohydrate which can no longer be precipitated by 95% alcohol treatment
[3]Calculated, assuming corn hull contains 17.4% alpha-cellulose
$\frac{(17.4 \times 100)}{\text{cellulose product}} = \%$ alpha-cellulose

CONDITIONS FOR PRODUCING XYLOSE

When it is not desired to obtain a hemicellulose fraction, more vigorous conditions of acid treatment may be utilized to extract and hydrolyze and hemicellulose to provide a high purity cellulose product and a solution rich in xylose.

The amount of xylose obtained will also be dependent upon whether the holocellulose fraction or the cellulose fraction described above is treated since xylose is a hydrolysis product of hemicellulose. In order to hydrolyze hemicellulose to xylose, strongly acidic conditions are required. The hydrolysis is carried out at pH levels of below about 1 for periods of from about 30 minutes to about 24 hours. Treatment temperatures above about 90° C. have given satisfactory results.

Since lignin is not present in the purified cellulose produced by the present method, the product may be bleached under relatively mild conditions as opposed to the relatively drastic conditions necessary to obtain chemical grade cellulose by the prior art methods. Moreover, in the prior art methods, the chemicals utilized contain large amounts of sulfur which present recovery and environmental problems.

In order to more clearly describe the nature of the present invention, specific examples will hereinafter be described. It should be understood, however, that this is done solely by way of example and is intended neither to delineate the scope of the invention nor limit the ambit of the appended claims.

EXAMPLE I

This Example illustrates the treatment of corn hulls to obtain three fractions therefrom and the treatment of the unpurified cellulose fraction with an acid to provide purified cellulose.

(1) Treatment of Corn Hulls

Coarse fiber from a corn wet milling operation containing 67.8 percent moisture was wet screened through a perforated screen having holes measuring 4.8 mm in diameter. Approximately 40 percent of the material was retained on the screen as relatively large intact corn hulls. The corn hulls were combined with sufficient water to provide a slurry containing about 5 percent solids and the pH adjusted to 6.5 by the addition of lime. Sufficient alpha-amylase was added to the slurry to provide therein 2.5 liquefons $g^{-1}$ d.s. and the slurry heated to 80°–90° C. until the achroic point was reached. The slurry was then dewatered and rinsed with water on the same size screen as noted above. The corn hulls retained on the screen were air dried, followed by further drying in a forced air oven at a temperature of 55° C. for a period of five hours. The dried corn hulls were then ground through a #2 screen on a Fitzpatrick mill.

Sufficient water at ambient temperature was added to 37.3 kg of the dried, ground corn hulls to provide a slurry having an 8 percent solids concentration. Sufficient NaOH was then added to the slurry to provide therein a concentration of 12 percent NaOH based on the weight of the hulls and the mixture heated to 100° C. with constant agitation. After the slurry was heated at this temperature for 3 hours, it was filtered and the filtrate recycled through the filter a number of times until the cellulosic cake had formed. The cake was then washed with water at ambient temperature. The washed cake was screened through a U.S. #30 series top screen to remove unpulped hulls, tip caps and foreign matter and the cellulose pulp collected on a U.S. #70 series screen. The pulp was dewatered and stored as a cake containing about 35 percent dry solids based on the weight of the corn hulls.

The combined filtrates and washings from the above procedures, comprising about 1360 liters, contained the non-carbohydrate material and hemicellulose removed from the corn hulls. These materials may be recovered by the process taught in U.S. Pat. No. 4,038,481.

(2) Preparation of Unpurified Cellulose

The pulp cake obtained as described above was diluted with deionized water and 1500 g thereof containing 4.97 percent dry substance was washed two times with two liter portions of deionized water. The cellulosic material recovered from the filter was resuspended in two liters of 3A alcohol and the mixture heated at 70° C. for a period of 10 minutes with occasional stirring. The heated mixture was filtered and the alcohol treatment repeated. Following the second filtration, the wet cellulosic cake was recovered and air dried at room temperature and ground to 40 mesh in a Wiley Mill. This material comprised impure cellulose containing residual hemicellulose as the major impurity.

(3) Preparation of Purified Cellulose

The dried, ground cellulosic material obtained in (2), above, was treated in the following manner in order to remove substantially all the hemicellulose and obtain purified cellulose.

Into each of eight 250 ml Erlenmeyer flasks equipped with Bunsen valves and magnetic stirrers was added 5.25 g (4.92 g, d.b.) of the unpurified cellulosic material and 200 ml of 0.1N $H_2SO_4$. The flasks were placed in a boiling water bath and the contents stirred. Individual flasks were removed from the bath at the end of eight different periods ranging from 5 to 120 minutes and filtered through a fritted glass medium porosity 50 ml funnel under reduced pressure. The purified cellulose products collected on the filters were individually washed with deionized water, dried by alcohol exchange and ground to 40 mesh. Each purified cellulose sample was analyzed for xylan, alpha-cellulose, and total cellulose content.

The supernates obtained at the termination of each of the above acid treatment procedures were further treated as follows: 10 ml of each supernate was neutralized with 0.25N $Ba(OH)_2$ to pH 6.5 and the $BaSO_4$ removed by centrifugation. The $BaSO_4$ precipitate was washed with one 10 ml portion of deionized water and recentrifuged. The centrifugates were combined and made up to volume in a 50 ml volumetric flask with distilled water. Two to three ml aliquots of the dilute solution were dried and trimethysilylated for GLC analysis of the monosaccharides present.

The amounts of alpha-cellulose and total cellulose obtained at the end of the various treatment periods, as well as the xylan content thereof are shown in Table III. Also shown are the xylose content and the total monosaccharide content of the supernates obtained at the termination of each treatment period.

TABLE III

RESULTS OF TREATING UNPURIFIED CORN HULL CELLULOSE AT 100° C. WITH 0.1N $H_2SO_4$

| Acid Treatment Time (min.) | Cellulosic Products (%, d.b.) | | | | Monosaccharides[1] (%) | |
|---|---|---|---|---|---|---|
| | Recovery[1] | Xylan Content | Total Cellulose Content | Alpha Cellulose Content | Xylose | Total |
| 0 | 100 | 27.06 | — | — | — | — |
| 5 | 77.9 | 13.10 | 85.42 | 78.05 | 0.00 | 0.00 |
| 10 | 72.3 | 8.44 | 90.64 | 82.87 | 0.00 | 0.13 |
| 20 | 66.2 | 4.78 | 93.53 | 85.49 | 0.29 | 1.51 |
| 40 | 65.7 | 3.70 | 94.50 | 86.37 | 0.67 | 2.14 |
| 60 | 63.1 | 4.32 | 93.74 | 87.31 | 1.05 | 2.69 |
| 80 | 64.1 | 5.28 | 91.70 | 86.60 | 1.26 | 2.94 |
| 100 | 62.1 | 3.38 | 94.03 | 86.98 | 1.64 | 3.41 |
| 120 | 64.1 | 3.35 | 93.41 | 86.78 | 2.14 | 4.46 |

[1] Based on unpurified corn hull cellulose (d.b.)

The data in the above table indicate that high yields of cellulose products having low xylan contents were obtained when the acid treatment was carried out for periods of less than two hours.

EXAMPLE II

This Example illustrates the present method for obtaining purified cellulose and a xylose-rich solution by treating unpurified cellulose with acid.

Example I was repeated with the exception that treatment of the unpurified cellulose with acid was carried out for periods of up to 24 hours. At the end of each period, the treated samples were filtered and the cellulosic products recovered, dried and analyzed for xylan content. The filtrates were analyzed for xylose, glucose, and total saccharide monomers as previously described.

The results are shown in Table IV.

TABLE IV

RESULTS OF TREATING UNPURIFIED CORN HULL CELLULOSE AT 100° C. WITH 0.1N $H_2SO_4$ FOR PROLONGED PERIODS

| Acid Pulping Time (hours) | Cellulosic Products (%, d.b.) | | Monosaccharides (%) | | |
|---|---|---|---|---|---|
| | Recovery | Xylan | Glucose | Xylose | Total Monomers |
| 0 | 100 | 27.06 | — | — | — |
| 4 | 63.03 | 2.88 | 0.00 | 3.15 | 5.89 |
| 6 | 62.17 | 3.15 | 0.04 | 3.74 | 6.73 |
| 8 | 60.93 | 2.12 | 0.08 | 3.95 | 7.02 |
| 12 | 61.55 | 2.10 | 0.17 | 4.12 | 7.40 |
| 16 | 60.98 | 1.97 | 0.29 | 4.21 | 7.65 |
| 24 | 57.67 | 1.28 | 0.55 | 4.37 | 8.11 |

The data in the above table demonstrate that treating the unpurified cellulose with acid for periods up to 24 hours results in cellulosic products having decreasing xylan contents. Concomitantly, the filtrates from the acid treatment procedure show an increasing content of total saccharide monomers, xylose and glucose. The appearance of glucose in the hydrolysate with prolonged heating after 6 hours indicates that cellulose degradation is probably occurring. This demonstrates that treatment of the unpurified cellulose with an acid solution at about pH 1.0 for periods of more than about 4 hours results in degredation of the purified cellulose. The filtrates may be neutralized with an alkaline material, e.g. $Ca(OH)_2$, filtered, and concentrated by normal methods to provide a xylose-rich solution.

EXAMPLE III

This Example illustrates bleaching of purified corn hull cellulose obtained by the process of the present invention.

40 g of unpurified corn hull cellulose prepared as described in Example I was heated in 1.5 liters of 0.1 N $H_2SO_4$ at a temperature of 100° C. for 20 minutes. The cellulose residue was collected by filtration and washed four times with deionized water.

To 30 g (2.95 g, d.b.) portions of the purified cellulose was added 90 ml of 0.2 M $Na_2CO_3$—$NaHCO_3$ buffer (pH 9.6). Small amounts of a sodium hypochlorite solution containing 9.14 percent $Cl_2$ (w/v) were added to the reaction mixtures with constant stirring in a single addition or in two or three stages. In the case where a single addition of hypochlorite solution was employed, the cellulose product was collected after the reaction mixture stood for four hours at ambient temperature. Where multi-stage addition was employed, the mixture was allowed to stand for four hours after each addition, the cellulose product recovered, washed with water and resuspended in 90 ml of the buffer before the next addition of hypochlorite solution.

The bleached cellulose products were collected by filtration under reduced pressure and washed four times with an excess of deionized water. During the third washing, the pH of the suspension was adjusted to 6.4 with 90 percent acetic acid. The cellulose residue was then washed with 3A alcohol and dried at room temperature. The results are shown in Table V. Pertinent data for a commercial chemical grade cellulose pulp are included for comparison purposes.

Ground, destarched corn hulls, obtained as shown in Example I, were treated to remove the non-carbohydrate fraction, whereby two kilograms of the corn hulls were suspended in 10 liters of 69% ethanol (v/v) containing 200 g of NaOH. The suspension was heated at reflux temperature with constant stirring for 16 hours and then cooled to 40° C. and filtered under reduced pressure. The insoluble residue was resuspended in 10 liters of 69% aqueous ethanol, the slurry adjusted to pH 3 with 6N HCl and heated at 60° C. for 3 hours. The slurry was filtered and the residue extracted again with 10 liters of 69% aqueous ethanol. This residue comprised the holocellulose fraction.

The residue from the above procedure was slurried in 14 liters of deionized water and the slurry heated at 30° C. for 3 hours with agitation to extract hemicellulose from the holocellulose fraction. The mixture was then filtered under reduced pressure and the extraction repeated two times using water at a temperature of 100° C. The filtrates were combined and analyzed for hemicellulose content.

The insoluble residue from the above procedure was slurried in water and screened through a 35 mesh screen to remove tip caps and other coarse materials. Screened wet cellulosic material containing 400 g of dry solids was treated with 0.1 N $H_2SO_4$ at 100° C. for 30 minutes to remove residual hemicellulose and 73.8 percent of the cellulose residue was recovered as purified dry corn hull cellulose. 277 g (d.b.) of the purified cellulose was bleached with two incremental treatments with sodium hypochlorite in 0.2 M $Na_2CO_3$—$NaHCO_3$ buffer, pH 9.6 at room temperature. The first treatment was carried out at a $Cl_2$ concentration of 2 percent for six hours

TABLE V
RESULTS OF TREATING PURIFIED CORN HULL CELLULOSE WITH SODIUM HYPOCHLORITE SOLUTION

| Trial # | Sodium Hypochlorite Solution Added (ml) | Chemical Addition ($Cl_2$%, Based on the Amount of Cellulose) | % Recovery | Alpha Cellulose (%, d.b.) | Total Cellulose (%, d.b.) |
|---|---|---|---|---|---|
| Chemical Grade Pulp[1] | 0 | 0 | 100 | 85.2 | 97.3 |
| Corn Hull Cellulose | 0 | 0 | 100 | 85.5 | 98.3 |
| 1 | 0.33 | 1 | 96.3 | 84.9 | 97.4 |
| 2 | 0.66 | 2 | 96.7 | 85.4 | 97.6 |
| 3 | 1.32 | 4 | 96.5 | 84.9 | 97.2 |
| 4 | 1.65 | 6 | 97.7 | 85.1 | 97.2 |
| 5[2] | 0.33 + 0.33 | 1 + 1 | 95.5 | 85.4 | 97.0 |
| 6[2] | 0.33 + 0.33 + 0.33 | 1 + 1 + 1 | 95.3 | 84.4 | 96.7 |

[1]C-100 = a commercial chemical grade sulfite pulp obtained from International Filler Corporation, North Tonawanda, N.Y.
[2]Multistage bleaching. In each stage, the chemical addition was 1% $Cl_2$ based on the cellulose.

The bleached cellulose products treated with sufficient hypochlorite solution to provide a $Cl_2$ concentration of above 2 percent had satisfactory brightness. Somewhat whiter products were obtained when the hypochlorite solution was added in stages than when single addition was utilized. The data in Table V indicate that the recovery of the purified cellulose products was unaffected by the bleaching procedure.

EXAMPLE IV

This Example illustrates the preparation of chemical grade cellulose from holocellulose derived from corn hulls.

and the second at a $Cl_2$ concentration of 1 percent for a period of four hours. Purified, bleached cellulose having satisfactory brightness was recovered as a wet cake containing 271 g of dry solids (97.9% recovery).

In Table VI are shown analytical data obtained for the unpurified cellulose, the acid treated intermediate product and the bleached chemical grade cellulose. For comparison purposes, also shown are analytical data on a commercial chemical grade cellulose pulp. The data indicate that in almost all aspects the purified and bleached cellulose product of the present invention was similar to the commercial product.

TABLE VI
RESULTS OF ANALYSIS OF CHEMICAL GRADE CELLULOSE OBTAINED BY TREATMENT OF THE HOLOCELLULOSE FRACTION OF CORN HULLS

|  | Unpurified Cellulose | Acid Purified Cellulose | Chemical Grade Corn Hull Cellulose (Purified & Bleached) | Commercial Grade Pulp[1] |
|---|---|---|---|---|
| % Nitrogen d.b. | 0.12 | 0.15 | 0.06 | 0.00 |
| % Extractive d.b. (Hexane) | 0.20 | 0.19 | 0.20 | 0.12 |
| % Extractive d.b. (Benzene-Alcohol) | 0.70 | 1.45 | 1.34 | 0.33 |
| % Ash (non-sulfated) | 0.31 | 0.07 | 0.26 | 0.19 |
| % Pentosan d.b. (Xylan Analysis) | 22.57 | 4.03 | 4.59 | 4.10 |
| % Solubility in 18% NaOH | 20.10 | 10.50 | 11.20 | 12.10 |
| Viscosity of 1% Solution in 0.5 M CED (cps) | 39.10 | 40.60 | 34.70 | 26.10 |
| % Alpha-Cellulose | ~62 | ~82 | 86.60 | 87.10 |
| % Carboxy | 0.12 | 0.00 | 0.04 | 0.18 |
| % Methoxy | 0.26 | 0.19 | 0.10 | 0.38 |

[1]C-100 = a commercial chemical grade sulfite pulp obtained from International Filler Corporation, North Tonawanda, N.Y.

EXAMPLE V

This Example illustrates the process for treating corn hulls to obtain intact hemicellulose and cellulose of improved purity.

50 g of ground, screened, destarched corn hulls which had been treated to remove a substantial portion of the non-carbohydrate fraction were suspended in about 500 ml of 69 percent aqueous ethanol. The pH of the suspension was adjusted to 3.0 using dilute HCl and the suspension stirred for five hours at room temperature and then filtered. The filter cake, representing the carbohydrate fraction, was recovered and dried in air.

Approximately 10 g (dry, ash-free basis) of the dried carbohydrate fraction was suspended in about 150 ml of deionized water and the pH of the suspension adjusted to about 3.2. The suspension was then heated with stirring at a temperature of 100° C. for a period of 5 minutes and filtered. The insoluble residue was suspended in about 150 ml of deionized water and the suspension heated at 100° C. for 30 minutes and filtered. The residue was again suspended in about 150 ml of deionized water and the suspension heated at 100° C. for 70 minutes and filtered. The filtrates from the above procedures were combined and reduced to a volume of about 150 ml in a rotary evaporator. About 3 volumes of 95 percent ethanol was then added to the concentrated filtrate to precipitate the solubilized hemicellulose which was recovered by filtration, air dried and weighed. The insoluble residue from the extraction procedures representing the cellulose fraction was washed with 95 percent ethanol, air dried and weighed.

Another treatment was carried out in exactly the same manner as that described above with the exception that only two extraction stages were performed, each for a period of 60 minutes.

The results of the two procedures are shown in Table VII.

TABLE VII
YIELDS OF HEMICELLULOSE AND CELLULOSE FRACTIONS FROM CORN HULLS[1]

| Number of Extraction Stages | Treatment Conditions | | | Yield of Fractions (%) | | Hydrolyzed[2] Component (%) |
|---|---|---|---|---|---|---|
| | Initial pH | Temperature (°C.) | Duration of Stages (min) | Hemi-Cellulose | Cellulose | |
| 2 | 3.2 | 100 | 60/60 | 49.2 | 24.4 | 5.5 |
| 3 | 3.2 | 100 | 5/30/70 | 53.4 | 24.4 | 1.3 |

[1]Expressed as percent of weight of starting corn hulls
[2]Represents degraded carbohydrate which can no longer be precipitated by 95% alcohol treatment The results in the above table indicate that carrying out the extraction in two stages each of 60 minutes duration causes greater degradation of the hemicellulose polymer than when three stages are utilized, the first two stages being carried out over shorter periods.

The terms and expressions which have been employed are used as terms of description and not of limitation, and it is not intended in the use of such terms and expressions to exclude any equivalents of the features shown and described or portions thereof, since it is recognized that various modifications are possible within the scope of the invention claimed.

What is claimed is:

1. In a method for treating corn hulls whereby the corn hulls are treated to solubilize non-carbohydrate material and to provide an impure cellulose product containing hemicellulose, the improvement comprising treating said cellulose product under acidic conditions whereby the hemicellulose is solubilized and a purified cellulose product having present at least about 70 percent alpha-cellulose, on a dry weight basis, is obtained.

2. A method for treating corn hulls as defined in claim 1, wherein the impure cellulose product comprises holocellulose.

3. A method for treating corn hulls as defined in claim 2, wherein the impure cellulose product is treated under acidic conditions at a pH of from about 2.0 to about 5.5 to obtain from about 45 to about 55 percent hemicellulose and a cellulose product containing at least about 70 percent alpha-cellulose on a dry weight basis.

4. A method for treating corn hulls as defined in claim 3, wherein the impure cellulose is treated under acidic conditions at a pH of from about 3.0 to about 4.5.

5. A method for treating corn hulls as defined in claim 4, wherein the impure cellulose product is treated under acidic conditions at a temperature of from about 75° to about 100° C.

6. A method for treating corn hulls as defined in claim 5, wherein the impure cellulose product is treated under acidic conditions for a period of from about 1 to about 120 minutes.

7. A method for treating corn hulls as defined in claim 6, wherein the impure cellulose product is treated under acidic conditions for a period of from about 5 to about 30 minutes.

8. A method for treating corn hulls as defined in claim 2, wherein the impure cellulose product is treated under acidic conditions at a pH of less than about 1.0 to obtain a solution containing xylose and a cellulose product containing from about 80 to about 87 percent alpha-cellulose on a dry weight basis.

9. A method for treating corn hulls as defined in claim 8, wherein the impure cellulose product is treated under acidic conditions at a temperature of above about 90° C.

10. A method for treating corn hulls as defined in claim 9, wherein the impure cellulose product is treated under acidic conditions for a period of from about 30 minutes to about 24 hours.

11. A method of treating corn hulls as defined in claim 10, wherein the impure cellulose is treated under acidic conditions for a period of from about 4 to about 6 hours.

12. A method for treating corn hulls as defined in claim 1, wherein the impure cellulose product is treated under acidic conditions to obtain a purified cellulose product having present from about 80 to about 88 percent alpha-cellulose on a dry weight basis.

13. A method for treating corn hulls as defined in claim 1, wherein the xylan content of the purified cellulose is less than about 5 percent as determined by the phloroglucinol procedure described in Official Methods of Analysis of the Association of Official Analytical Chemists, 10th Edition.

14. A method of treating corn hulls as defined in claim 1, wherein the impure cellulose product is treated under acidic conditions in two or more steps.

* * * * *

UNITED STATES PATENT OFFICE
CERTIFICATE OF CORRECTION

PATENT NO. : 4,239,906
DATED : December 16, 1980
INVENTOR(S) : Richard L. Antrim, et al.

It is certified that error appears in the above-identified patent and that said Letters Patent are hereby corrected as shown below:

Column 1, line 43, "a" should be deleted.

Column 2, last line, "4,039,481" should read -- 4,038,481 --.

Column 5, line 51, "and", second occurrence, should read -- the --.

Signed and Sealed this

Fourteenth Day of April 1981

[SEAL]

Attest:

RENE D. TEGTMEYER

Attesting Officer     Acting Commissioner of Patents and Trademarks